(12) United States Patent
Song et al.

(10) Patent No.: US 10,777,358 B2
(45) Date of Patent: Sep. 15, 2020

(54) CAPACITOR COMPONENT

(71) Applicant: SAMSUNG ELECTRO-MECHANICS CO., LTD., Suwon-si, Gyeonggi-do (KR)

(72) Inventors: Young Hoon Song, Suwon-si (KR); Byung Yong Wang, Suwon-si (KR); Tae Hyeong Kim, Suwon-si (KR); Dong Kyu Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 6 days.

(21) Appl. No.: 16/293,194

(22) Filed: Mar. 5, 2019

(65) Prior Publication Data

US 2020/0168401 A1    May 28, 2020

(30) Foreign Application Priority Data

Nov. 23, 2018 (KR) .......................... 10-2018-0145912

(51) Int. Cl.
*H01G 4/30*  (2006.01)
*H01G 4/228*  (2006.01)
*H01G 4/012*  (2006.01)
*H01G 4/12*  (2006.01)

(52) U.S. Cl.
CPC ............... *H01G 4/30* (2013.01); *H01G 4/012* (2013.01); *H01G 4/12* (2013.01); *H01G 4/228* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224; H01G 4/228
See application file for complete search history.

(56) References Cited

U.S. PATENT DOCUMENTS

| | | | |
|---|---|---|---|
| 6,475,317 B1 | 11/2002 | Baba et al. | |
| 2006/0214263 A1* | 9/2006 | Kojima | H01G 4/30 257/532 |
| 2012/0140377 A1 | 6/2012 | Kim et al. | |

FOREIGN PATENT DOCUMENTS

| | | |
|---|---|---|
| JP | 2014-220324 A | 11/2014 |
| KR | 10-2000-0076700 A | 12/2000 |
| KR | 10-2012-0062238 A | 6/2012 |

* cited by examiner

*Primary Examiner* — Michael P McFadden
(74) *Attorney, Agent, or Firm* — Morgan, Lewis & Bockius LLP

(57) ABSTRACT

Dielectric patterns may be additionally disposed in margin portions, and thicknesses of the dielectric patterns may be controlled to improve the reliability of a capacitor component.

15 Claims, 10 Drawing Sheets

CAPACITOR COMPONENT

CROSS-REFERENCE TO RELATED APPLICATIONS

This application claims the benefit of priority to Korean Patent Application No. 10-2018-0145912 filed on Nov. 23, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor is a chip-type condenser mounted on the printed circuit boards of a variety of electronic products such as image display devices, including liquid crystal displays (LCDs), plasma display panels (PDPs), and the like, computers, smartphones, mobile phones, and the like, serving to charge or discharge electricity.

Such a multilayer ceramic capacitor may be used as a component of various electronic devices as it is relatively small in size, able to secure high capacitance, and is convenient to install. As electronic devices such as computers and mobile devices are becoming increasingly miniaturized and increased in power, there has been increased demand for a multilayer ceramic capacitor having a compact size and high capacitance.

Further, as there has been increasing interest in vehicle components in related industries, multilayer ceramic capacitors are increasingly required to have high reliability and high strength characteristics in order to be used in vehicles or infotainment systems.

As the number of layers being laminated increases, more step portions may be formed due to differences in thickness between internal electrodes and dielectric layers. Such step portions may cause undesirable bending of end portions of the electrodes when the dielectric layers are laterally elongated during a densification process of compressing a body.

In particular, end portions of the internal electrodes may bend to fill the step portions, and margin portions, serving to eliminate empty spaces formed by the step portions as covers may be depressed and margin widths decreased. As the empty spaces formed by the step portions are eliminated, capacitance layers may be elongated to an extent to which the margin width is reduced. Due to such structurally irregular elongations inside the internal electrodes, reliability of a multilayer ceramic capacitor, such as withstand voltage properties, may degrade.

SUMMARY

An aspect of the present disclosure is to provide a capacitor component having excellent reliability.

According to an aspect of the present disclosure, a capacitor component comprises: a body including first and second dielectric layers, and having first and second surfaces opposing each other in a thickness direction, third and fourth surfaces connected to the first and second surfaces and opposing each other in a length direction, and fifth and sixth surfaces connected to the first to fourth surfaces and opposing each other in a width direction; a first internal electrode disposed on the first dielectric layer, exposed to the third surface, and spaced apart in the length and width directions from the fourth, fifth, sixth surfaces by a first space; a second internal electrode disposed on the second dielectric layer and opposing the first internal electrode with the first or second dielectric layer interposed therebetween, exposed to the fourth surface, and spaced apart in the length and width directions from the third, fifth and sixth surfaces by a second space; a first dielectric pattern disposed in at least a portion of the first space, extending from the first space, and covering an end portion of the first internal electrode in the thickness direction; a second dielectric pattern disposed in at least a portion of the second space, extending from the second space, and covering an end portion of the second internal electrode in the thickness direction; and first and second external electrodes disposed on the third and fourth surfaces of the body, respectively, and electrically connected to the first and second internal electrodes, respectively, wherein a ratio of t1/te is within the range of 0.6 to 0.9, where "t1" is an average thickness of the first and second dielectric patterns, and "te" is an average thickness of the first and second internal electrodes.

According to another aspect of the present disclosure, a capacitor component comprises: a body having first and second surfaces opposing each other in a thickness direction, third and fourth surfaces connected to the first and second surfaces and opposing each other in a length direction, and fifth and sixth surfaces connected to the first to fourth surfaces and opposing each other in a width direction, the body including at least one first internal electrode and at least one second internal electrode with at least one dielectric layer interposed therebetween in the thickness direction; and first and second external electrodes disposed on the third and fourth surfaces of the body, respectively, and electrically connected to the at least one first internal electrode and the at least one second internal electrode, respectively, in which the at least one first internal electrode and the at least one second internal electrode are exposed to the third and fourth surfaces, respectively, of the body to be electrically connected to the first and second external electrodes, respectively. The body further includes a first dielectric pattern disposed on a same plane as the at least one first internal electrode and disposed between an end portion of the at least one first internal electrode and an adjacent outer surface of the body to which the at least one first internal electrode is not exposed, the first dielectric pattern having a step portion overlapping the end portion of the at least one first internal electrode in the thickness direction, and the body further includes a second dielectric pattern disposed on a same plane as the at least one second internal electrode and disposed between an end portion of the at least one second internal electrode and an adjacent outer surface of the body to which the at least one second internal electrode is not exposed, the second dielectric pattern having a step portion overlapping the end portion of the at least one second internal electrode in the thickness direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
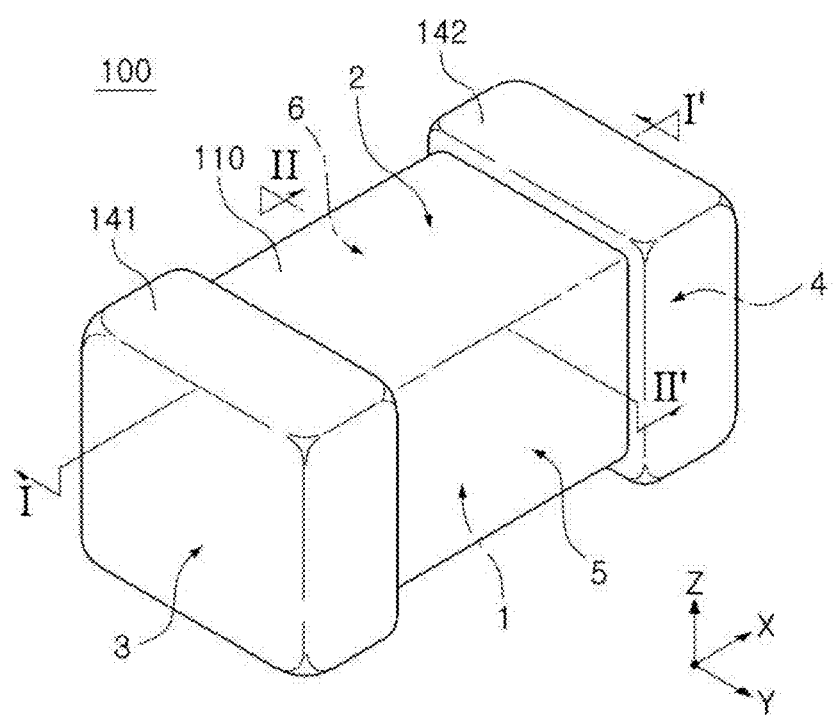
FIG. 1 is a schematic perspective view of a capacitor component according to an exemplary embodiment in the present disclosure.

Hereinafter, embodiments of the present disclosure will be described in detail with reference to the accompanying drawings. The embodiments of the present disclosure may, however, be modified in many different forms, and accordingly, the scope of the present disclosure should not be construed as being limited to the embodiments set forth herein. Rather, these embodiments are provided to provide thorough understanding to those skilled in the art. Accordingly, in the drawings, the shapes and dimensions of elements may be exaggerated for clarity, and the same reference numerals will be used throughout to designate the same or like elements.

Further, in the drawings, irrelevant descriptions will be omitted to clearly describe the present disclosure, and to clearly express a plurality of layers and areas, thicknesses may be magnified. Elements having the same function within the scope of the same concept will be described with use of the same reference numeral. Further, throughout the specification, it will be understood that when a part "includes" an element, it may further include another element, not excluding another element, unless otherwise indicated.

In the drawings, an X direction may be defined as a second direction, an L direction, or a length direction, a Y direction as a third direction, a W direction, or a width direction, and a Z direction as a first direction, a lamination direction, a T direction, or a thickness direction.

Capacitor Component

FIG. 1 is a schematic perspective view of a capacitor component according to an exemplary embodiment in the present disclosure.

Figure 2:
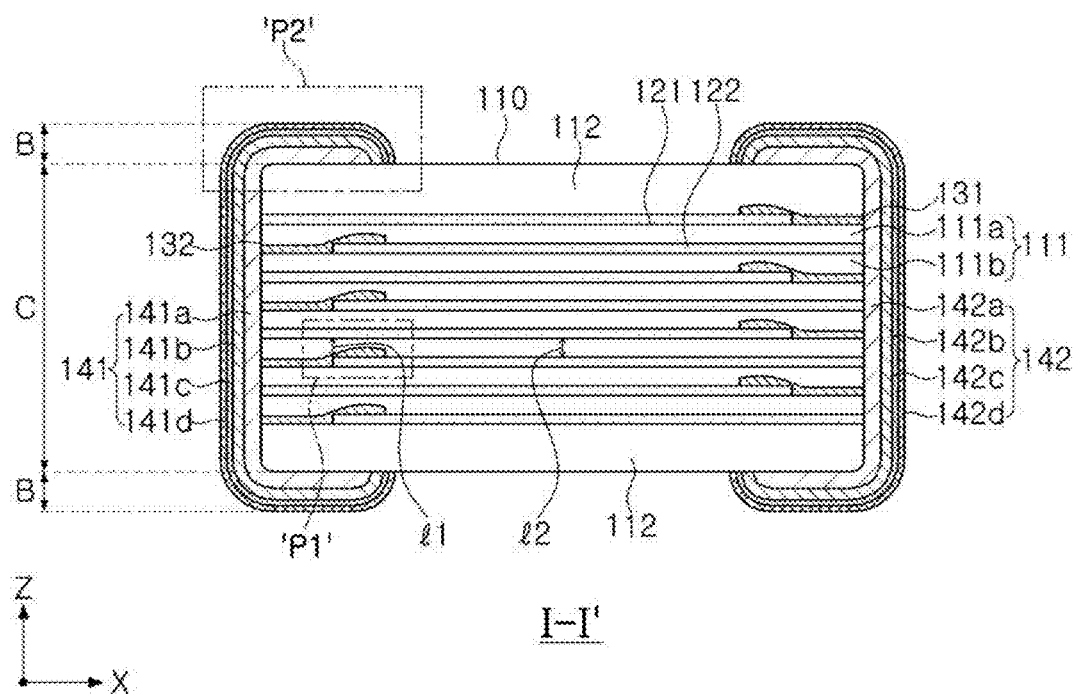
FIG. 2 is a schematic cross-sectional view taken along line I-I' shown in FIG. 1.

FIG. 2 is a schematic cross-sectional view taken along line I-I' shown in FIG. 1.

Figure 3:
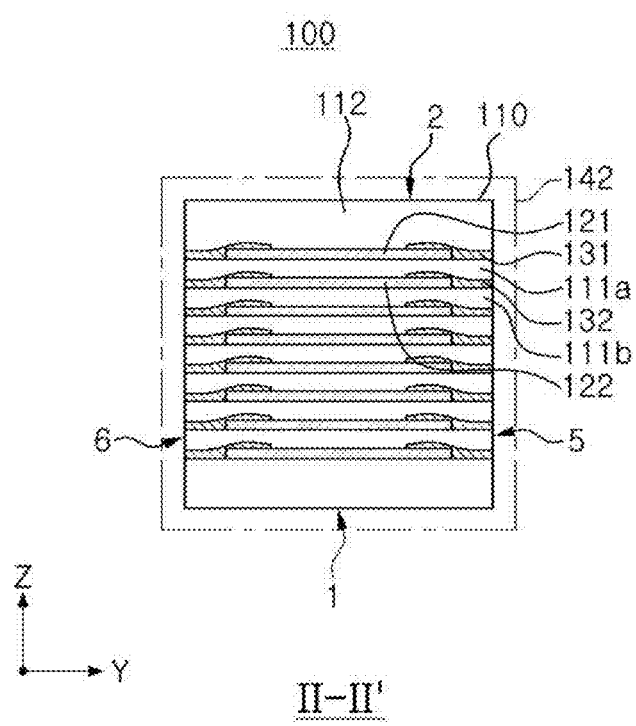
FIG. 3 is a schematic cross-sectional view taken along line II-II' shown in FIG. 3.

FIG. 3 is a schematic cross-sectional view taken along line II-II' shown in FIG. 1.

Figure 4A:
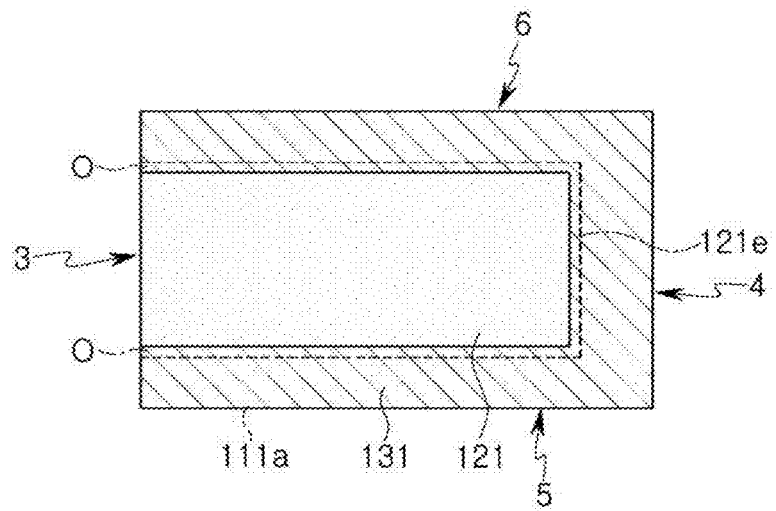
FIG. 4A illustrates a first dielectric layer having a first internal electrode and a first dielectric pattern printed thereon.
Figure 4B:
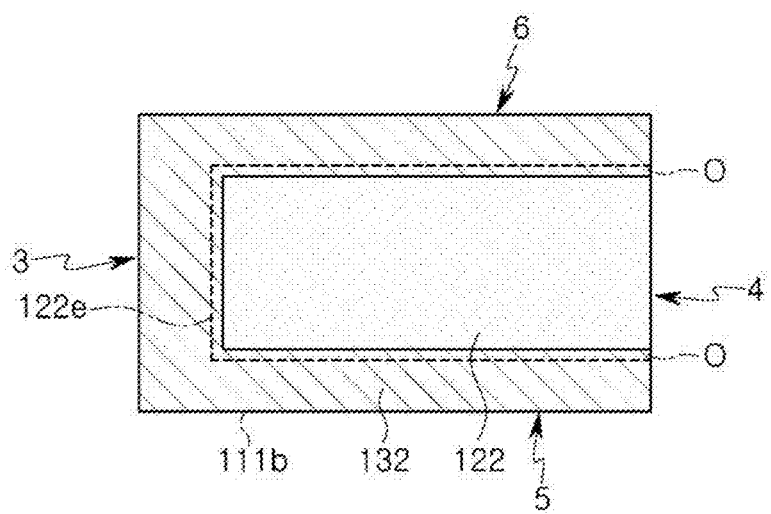
FIG. 4B illustrates a second dielectric layer having a second internal electrode and a second dielectric pattern printed thereon.

FIG. 4a illustrates a first dielectric layer having a first internal electrode and a first dielectric pattern printed thereon, and FIG. 4b illustrates a second dielectric layer having a second internal electrode and a second dielectric pattern printed thereon.

Figure 5:
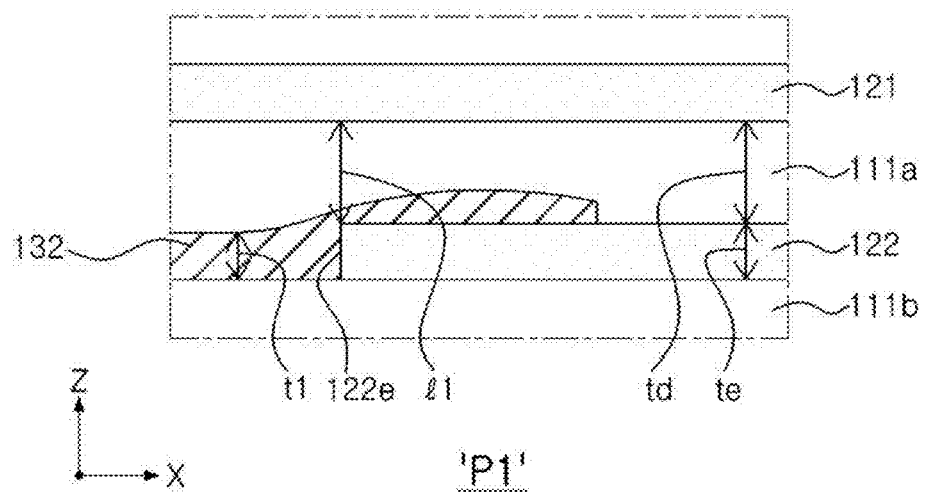
FIG. 5 is an enlarged view of region P1 shown in FIG. 2.

FIG. 5 is an enlarged view of region P1 shown in FIG. 2.

Figure 6:
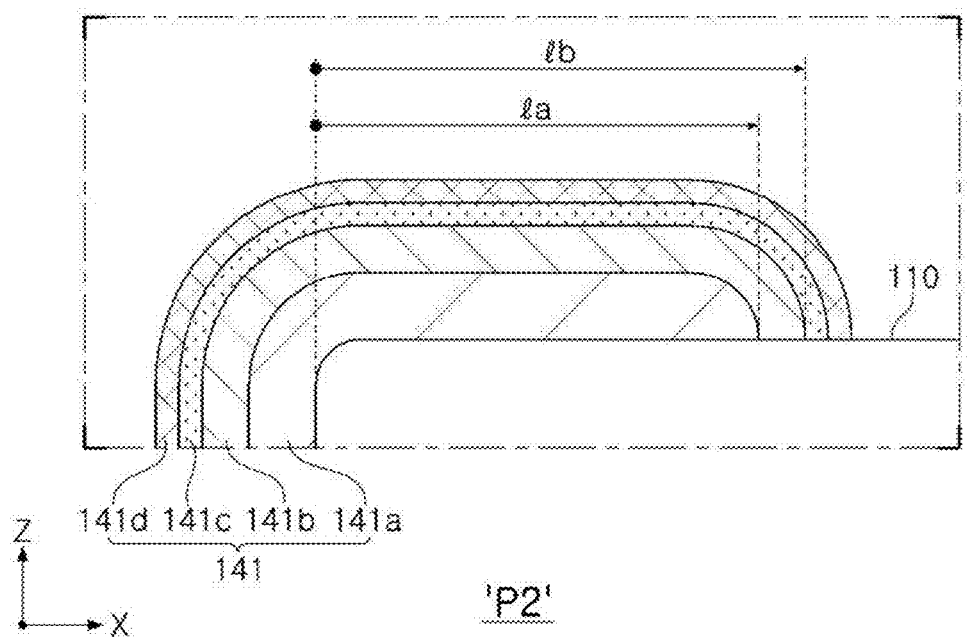
FIG. 6 is an enlarged view of region P2 shown in FIG. 2.

FIG. 6 is an enlarged view of region P2 shown in FIG. 2.

Hereinbelow, a capacitor component according to an exemplary embodiment in the present disclosure will be described in detail with conjunction with FIGS. 1 through 6.

A capacitor component 100 according to an exemplary embodiment comprises: a body 110 including first and second dielectric layers 111a and 111b, and having first and second surfaces 1 and 2 opposing each other, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other; a first internal electrode 121 disposed on the first dielectric layer 111a, exposed through the third surface 3, and spaced apart from the fourth to sixth surfaces 4, 5, and 6 by a first space; a second internal electrode 122 disposed on the second dielectric layer 111b and opposing the first internal electrode 121 with the first or second dielectric layer 111a or 111b interposed therebetween, exposed through the fourth surface 4, and spaced apart from the third, fifth and sixth surfaces 3, 5, and 6 by a second space; a first dielectric pattern 131 disposed in at least a portion of the first space and extending from the first space so as to cover an end portion of the first internal electrode 121; a second dielectric pattern 132 disposed in at least a portion of the second space and extending from the second space so as to cover an end portion of the second internal electrode 122; and first and second external electrodes 141 and 142 disposed on the third and fourth surfaces 3 and 4 of the body 110, respectively, and connected to the first and second internal electrodes 121 and 122, respectively, wherein a ratio of t1/te is within the range of 0.6 or more to 0.9 or less, where t1 is an average thickness of the first and second dielectric patterns 131 and 132, and te is an average thickness of the first and second internal electrodes 121 and 122.

The dielectric layers 111 and the internal electrodes 121 and 122 may be alternately laminated inside the body 110.

The shape of the body 110 is not limited to any particular shape, but as illustrated, the body 110 may have a hexahedron shape or a shape similar thereto. Due to shrinkage of a ceramic powder contained in the body 110 during a sintering process, the body 110 may not have an exact hexahedron shape with completely straight lines, but may have a substantially hexahedron shape.

The body 110 may have first and second surfaces 1 and 2 opposing each other in a thickness direction (a Z direction), third and fourth surfaces 3 and 4 connected to the first and second surfaces 1 and 2 and opposing each other in a length direction (an X direction), and fifth and sixth surfaces 5 and 6 connected to the first and second surfaces 1 and 2, connected to the third and fourth surfaces 3 and 4, and opposing each other in a width direction (a Y direction).

A plurality of dielectric layers 111 forming the body 110 may be in a sintered state and may be integrated with one another, such that boundaries between adjacent dielectric layers 111 may be difficult to identify without using a scanning electron microscope (SEM).

According to the exemplary embodiment, the material forming the dielectric layer 111 is not limited to any particular material as long as sufficient capacitance can be obtained therefrom. For example, as the material forming the dielectric layer 111, a barium titanate-based material, a lead composite perovskite-based material, or a strontium titanate-based material may be used.

As the material forming the dielectric layer 111, various ceramic additives, organic solvents, plasticizers, binders, dispersing agents, or the like, may be added to powder particles such as barium titanate ($BaTiO\_3$) powder particles and the like, according to the purpose of the present disclosure.

Lower and upper cover layers 112 having a predetermined thickness may be formed on a lower portion of a lowermost internal electrode and on an upper portion of an uppermost internal electrode of the body 110, respectively. In particular, the lower and upper cover layers 112 may be formed using the same composition as the dielectric layers 111, and may be formed by laminating at least one dielectric layer not containing internal electrodes on the lower portion of the lowermost internal electrode and on the upper portion of the uppermost internal electrode of the body 110.

The dielectric layers 111 may include first and second dielectric layers 111a and 111b, and the internal electrodes 121 and 122 may include first and second internal electrodes 121 and 122.

Referring to FIG. 4a and FIG. 4b, the body 110 may be formed by alternately laminating the first dielectric layer 111a having the first internal electrode 121 and the first dielectric pattern 131 printed thereon and the second dielectric layer 111b having the second internal electrode 122 and the second dielectric pattern 132 thereon in a thickness direction (a Z direction), and sintering the laminated dielectric layers.

The first internal electrode 121 may be disposed on the first dielectric layer 111a. The first internal electrode 121 may be disposed on the first dielectric layer 111a so as to be exposed through the third surface 3 of the body 110. In particular, the first internal electrode 121 may be spaced apart from the fourth to sixth surfaces 4, 5, and 6 by a predetermined distance. The region spaced apart between the first internal electrode 121 and the fourth to sixth surfaces 4, 5, and 6 may be defined as a first space.

The second internal electrode 122 may be disposed on the second dielectric layer 111b. The second internal electrode 122 may be disposed on the second dielectric layer 111b so as to be exposed through the fourth surface 4 of the body 110. In particular, the second internal electrode 122 may be spaced apart from the third, fifth and sixth surfaces 3, 5, and 6 by a predetermined distance. The region spaced apart between the second internal electrode 122 and the third, fifth and sixth surfaces 3, 5, and 6 may be defined as a second space.

The first and second internal electrodes 121 and 122 may be laminated on ceramic sheets forming the first dielectric layer 111a and the second dielectric layer 111b, and through a sintering process, may be alternately disposed in a thickness direction with one dielectric layer 111a or 111b interposed therebetween inside the body 110.

The first and second internal electrodes 121 and 122 have different polarities from each other, may be disposed to oppose each other in a lamination direction in which the dielectric layers 111a and 111b are laminated, and may be electrically insulated from each other by the dielectric layers 111a and 111b.

When the first and second internal electrodes 121 and 122 are exposed to the outside of the body 110, short circuits may occur due to conductive foreign materials entering from the outside, thus causing degradations in reliability of a capacitor component.

Accordingly, when forming the internal electrodes 121 and 122 inside the dielectric layers 111a and 111b, an area of the dielectric layers 111a and 111b may be formed to be greater than the area of the internal electrodes 121 and 122, to form margin portions in outer portions of the internal electrodes excluding the parts of the internal electrodes connected to the external electrodes. In particular, the margin portions may refer to portions of a dielectric material in which the internal electrodes 121 and 122 are not formed, and the first and second spaces described above may correspond to the margin portions.

When the internal electrodes 121 and 122 are formed in the dielectric layers 111a and 111b in a manufacturing process, the internal electrodes 121 and 122 may have a shape protruding from the margin portions. Such protruding shapes may give rise to step portions, and when several tens to several thousands of dielectric layers 111a and 111b are laminated together, the dielectric layers 111a and 111b may be drawn out to fill such step portions. When the dielectric layers 111a and 111b are drawn out, the internal electrodes 121 and 122 may bend with the dielectric layers 111a and 111b. When the internal electrodes 121 and 122 are bent, breakdown voltage (BDV) in the bent portions may suffer an undesirable decrease.

Accordingly, the capacitor component according to the exemplary embodiment prevents the step portions from forming from the internal electrodes 121 and 122 by disposing the first and second dielectric patterns 131 and 132 in the first and second spaces, respectively. Accordingly, the internal electrodes may be prevented from bending, and degradation of breakdown voltage characteristics may be avoided, thus improving reliability of a multilayer ceramic capacitor.

Figure 11:
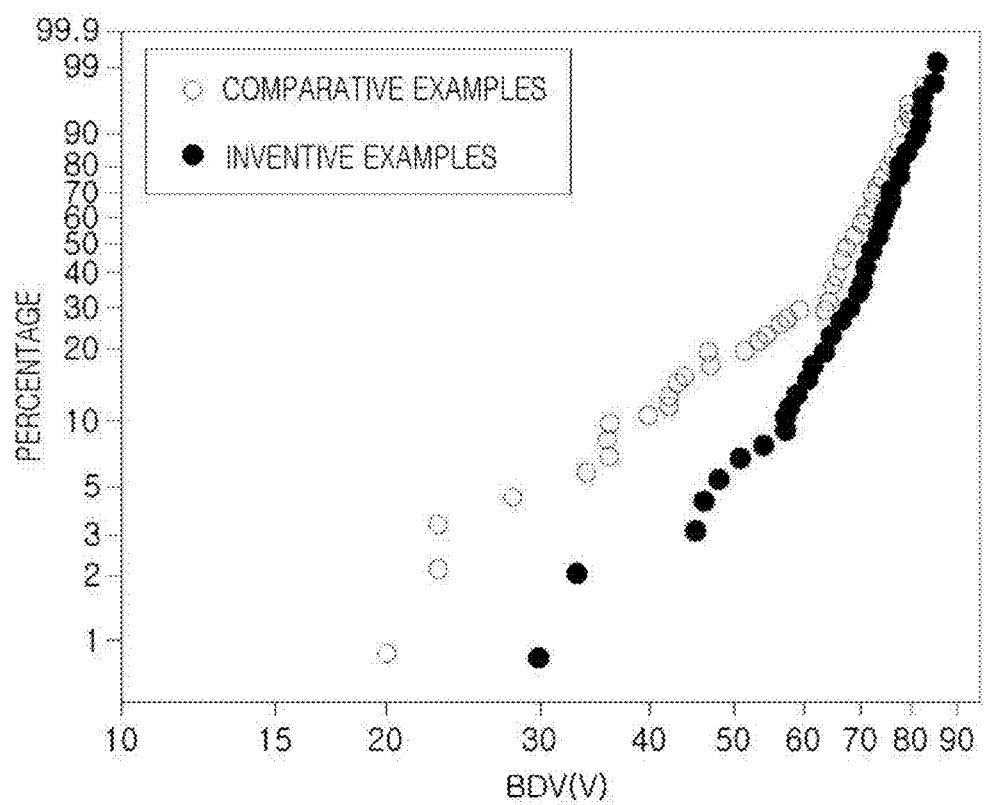
FIG. 11 is a graph showing the measurements of breakdown voltages of Inventive Examples and Comparative Examples.

FIG. 11 is a graph showing the measurements of breakdown voltages of Inventive Examples and Comparative Examples.

Inventive Examples include the first and second dielectric patterns 131 and 132, and Comparative Examples do not include the first and second dielectric patterns 131 and 132.

One thousand samples were prepared for each of Inventive Example and Comparative Example, breakdown voltages were measured along with increasing voltage, and the samples which broke down were expressed as a percentage.

It was observed that the mean breakdown voltage (BDV) and variation distribution had improved as the first and second dielectric patterns 131 and 132 were disposed.

In addition, the dielectric pattern 131 may extend from the first space so as to cover an end portion of the first internal electrode 121, and the second dielectric pattern 132 may extend from the second space so as to cover an end portion of the second internal electrode.

As illustrated in FIG. 4a and FIG. 4b, there may be overlapped regions O in which the end portions 121e and 122e of the first and second internal electrodes are covered by the first and second dielectric patterns 131 and 132.

Figure 7A:
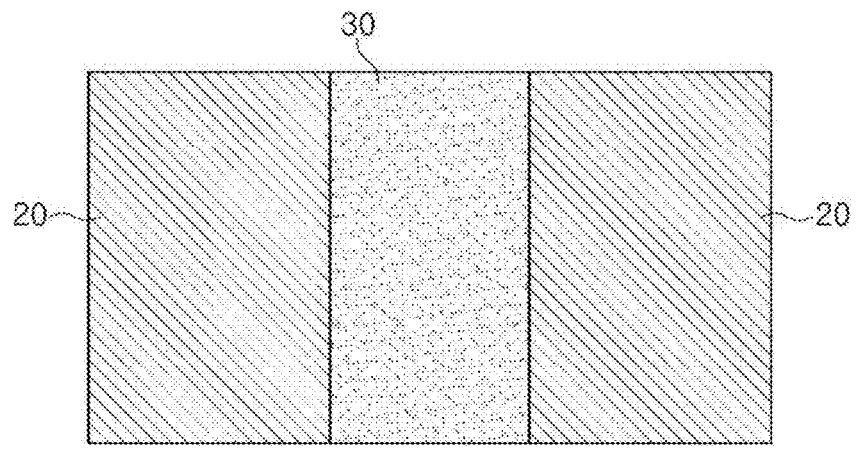
FIG. 7A illustrates a case in which an internal electrode and a dielectric pattern, disposed on a ceramic sheet, are aligned smoothly without forming a step portion during a manufacturing process.
Figure 7B:
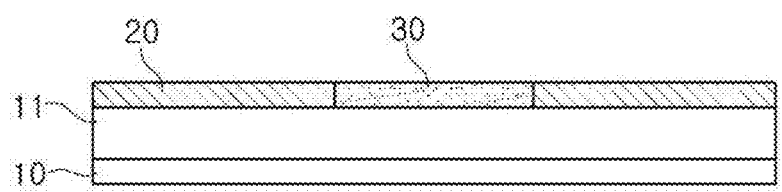
FIG. 7B is a cross-sectional view of FIG. 7A.

FIG. 7a illustrates a case in which an internal electrode and a dielectric pattern, disposed on a ceramic sheet, are aligned smoothly without forming a step portion during a manufacturing process, and FIG. 7b is a cross-sectional view of FIG. 7a.

Figure 8A:
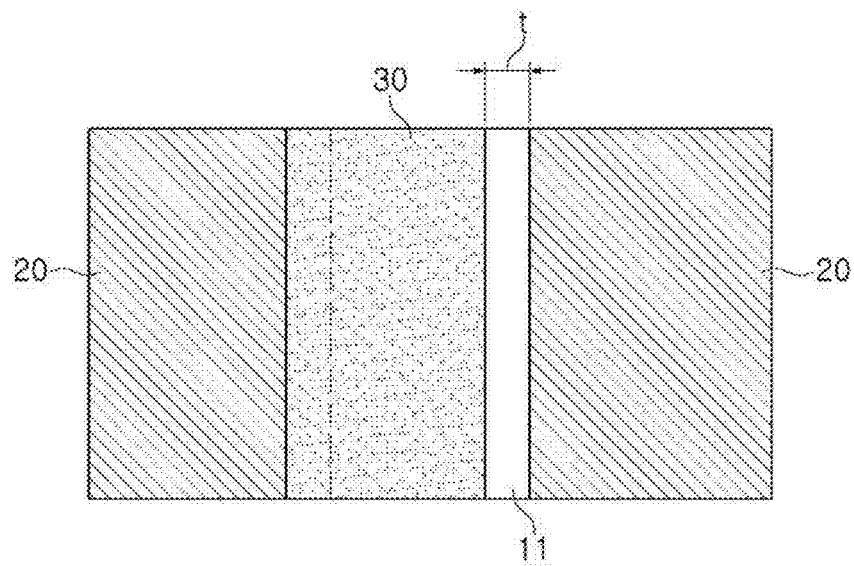
FIG. 8A illustrates a case in which an internal electrode and a dielectric pattern, disposed on a ceramic sheet, are misaligned during a manufacturing process.
Figure 8B:
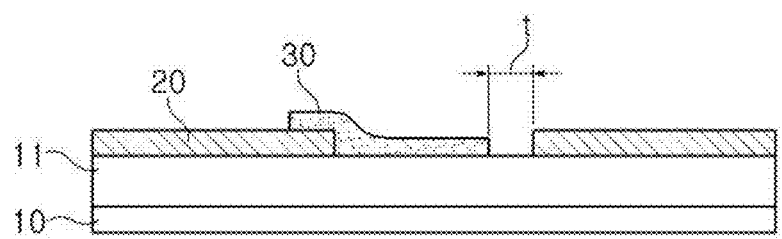
FIG. 8B is a cross-sectional view of FIG. 8A.

FIG. 8a illustrates a case in which an internal electrode and a dielectric pattern, disposed on a ceramic sheet, are misaligned during a manufacturing process, and FIG. 8b is a cross-sectional view of FIG. 8a.

Figure 9A:
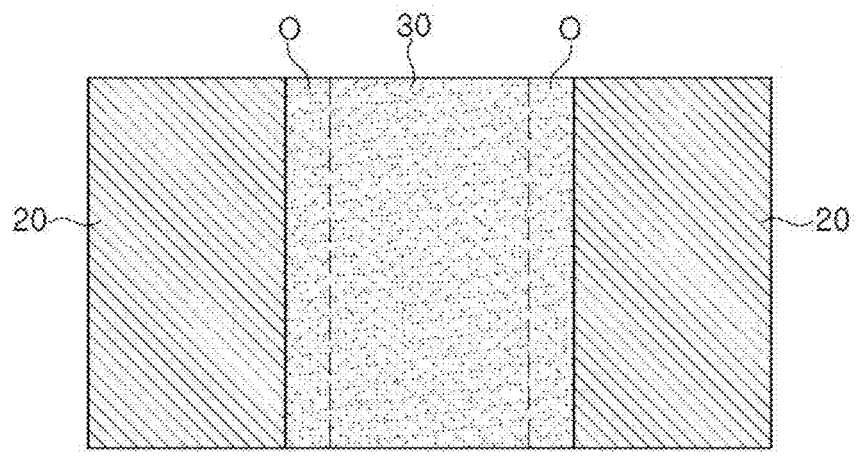
FIG. 9A illustrates a case in which an internal electrode and a dielectric pattern, disposed on a ceramic sheet, are aligned smoothly without forming a step portion during a manufacturing process using a dielectric pattern having a width greater than that of a gap between internal electrodes.
Figure 9B:
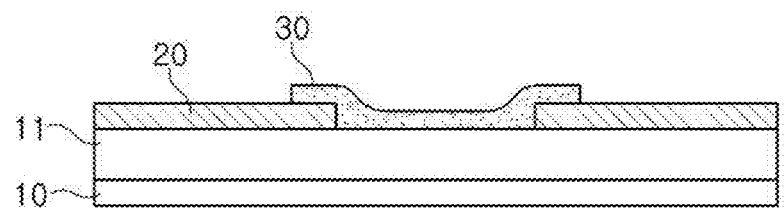
FIG. 9B is a cross-sectional view of FIG. 9A.

FIG. 9a illustrates a case in which an internal electrode and a dielectric pattern, disposed on a ceramic sheet, are aligned smoothly without forming a step portion during a manufacturing process using a dielectric pattern having a width greater than that of a gap between internal electrodes, and FIG. 9b is a cross-sectional view of FIG. 9a.

Figure 10A:
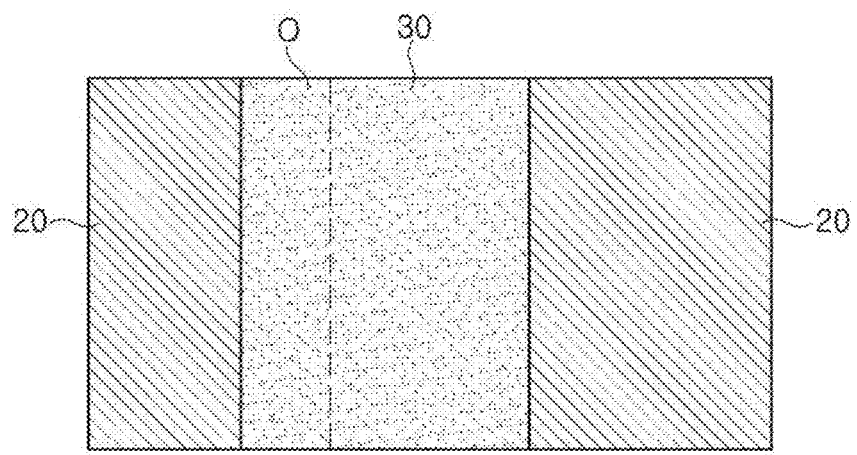
FIG. 10A illustrates a case in which an internal electrode and a dielectric pattern, disposed on a ceramic sheet, are misaligned during a manufacturing process using a dielectric pattern having a width greater than that of a gap between internal electrodes.
Figure 10B:
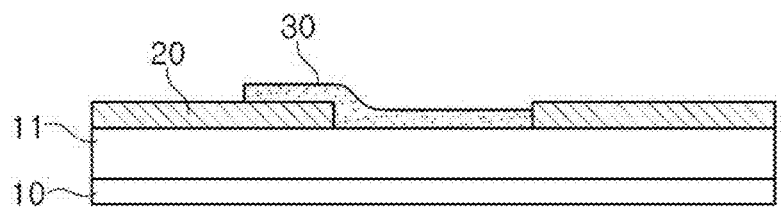
FIG. 10B is a cross-sectional view of FIG. 10A.

FIG. 10a illustrates a case in which an internal electrode and a dielectric pattern, disposed on a ceramic sheet, are misaligned during a manufacturing process using a dielectric pattern having a width greater than that of a gap between internal electrodes, and FIG. 10b is a cross-sectional view of FIG. 10a.

Referring to FIGS. 7 and 8, in general, a step portion of forming internal electrodes and dielectric patterns during a manufacturing process for a multilayer ceramic capacitor involves forming a ceramic sheet 11 on a jig 10, thereafter printing an internal electrode 20 on one side of the ceramic sheet 11, and then, printing a dielectric pattern 30 in a gap between the printed internal electrodes in a length direction (x). The ceramic sheet 11, once completed, becomes first and second dielectric layers 111a and 111b, and the dielectric pattern 30 becomes the first and second dielectric patterns 131 and 132.

In particular, forming the dielectric pattern precisely in a desired position may be an important factor in significantly reducing the defect rates. Accordingly, the dielectric pattern 30 should be formed precisely between the internal electrodes 20 as illustrated in FIG. 7, however, if the dielectric pattern 30 is not printed precisely in a desired target position due to an error in the manufacturing process, the dielectric pattern 30 may be formed disproportionately toward one side between the internal electrodes 20 by a distance t. If the dielectric pattern 30 is not in contact with the internal electrode 20 on the other side, even when the dielectric pattern 30 is formed, the issues associated with step portion formation cannot be addressed.

Alternatively, referring to FIG. 9 and FIG. 10, when the dielectric pattern 30 may be disposed to cover an end portion of the internal electrode 20, the issues associated with step portion formation may be addressed, not only when the dielectric pattern 30 is formed precisely in a desired position as illustrated in FIG. 9, but also when the dielectric pattern 30 is formed disproportionately towards one side between the internal electrodes 20.

Accordingly, by having the first and second dielectric patterns 131 and 132 disposed so as to cover end portions of the first and second internal electrodes 121 and 122, it may be possible to address the issues with step portion formation due to the internal electrodes more effectively, and further improve the productivity and reliability of a capacitor component.

In particular, since the first and second dielectric patterns 131 and 132 extend so as to cover the end portions of the first and second internal electrodes 121 and 122, a distance l1 between the first and second internal electrodes 121 and 122 adjacent to each other at end portions 121e and 122e of the first and second internal electrodes 121 and 122 may be greater than a distance l2 between the first and second internal electrodes 121 and 122 adjacent to each other in a center portion of the body.

In particular, when t1 is defined as an average thickness of the first and second dielectric patterns 131 and 132, and te is defined as an average thickness of the first and second internal electrodes 121 and 122, a ratio t1/te may be within the range of 0.6 to 0.9.

When t1/te is less than 0.6, it may be difficult to address the issues with step portion formation due to internal electrodes.

Alternatively, when t1/te exceeds 0.9, during lamination and compression processes, air present between the ceramic sheets would not escape but remain inside the body 110, forming an undesirably large quantity of air traps.

Figure 12:
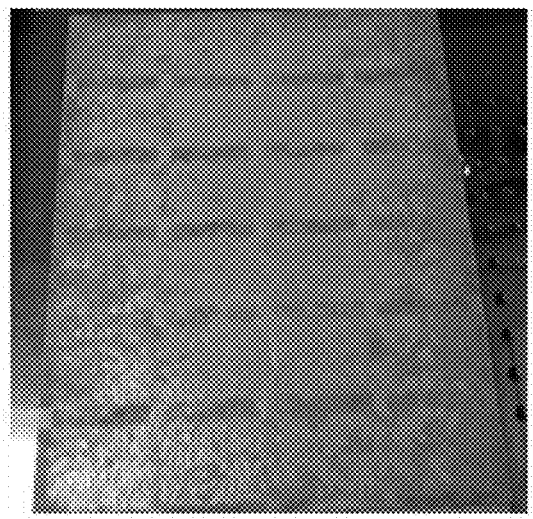
FIG. 12 is a photograph showing a surface of a laminate in which air traps have occurred.

FIG. 12 is a photograph of a surface of a laminate prepared by laminating and compressing the dielectric layers 111a and 111b, each having a thickness of 2.1 µm, and having the dielectric patterns 131 and 132 printed thereon such that t1/te equals 1. As shown in FIG. 12, the portions lighter in color and with uneven surfaces are where air traps occurred, and it was observed that such air traps occurred in a large quantity. Alternatively, no air traps occurred when the dielectric layers 111a and 111b, each having a thickness of 2.1 µm, and having the dielectric patterns 131 and 132 printed thereon such that a ratio t1/te equals 0.8, were laminated and compressed.

In addition, an average dielectric grain size of the first and second dielectric patterns 131 and 132 may be smaller than an average dielectric grain size of the first and second dielectric layers 111a and 111b.

The first and second dielectric patterns 131 and 132 have a solid content relatively lower than that of the first and second dielectric layers 111a and 111b, and thus may have inferior sintered density.

In particular, the first and second dielectric patterns 131 and 132 may have a different color from the first and second dielectric layers 111a and 111b.

Accordingly, misalignment issues in printing dielectric patterns due to manufacturing errors may be reduced, and a process for correcting printing misalignment issues may be performed more conveniently.

A commonly-known coloring agent may be used to give the first and second dielectric patterns 131 and 132 a different color from a color of the first and second dielectric layers 111a and 111b, and for example, coloring agents such as a pigment and a dye may be used. In addition, even without using a coloring agent, the first and second dielectric patterns 131 and 132 and the first and second dielectric layers 111a and 111b may exhibit different colors from each other according to a difference in sintering properties.

However, using a pigment or a dye in the form of a pure organic material may increase the sintered density of a multilayer ceramic capacitor and degrade the hardness of a multilayer ceramic capacitor.

Also, when a metal complex dye containing a metal complex including metal complexed in the molecule and a Cu-containing dye containing phthalocyanine are used, inherent characteristics of a capacitor component may not degrade.

Accordingly, for the first and second dielectric patterns 131 and 132 and the first and second dielectric layers 111a and 111b to have a different color from each other, the first and second dielectric patterns 131 and 132 may contain a metal complex.

External electrodes 141 and 142 may be disposed on an outer side of the body 110 and connected to the internal electrodes 121 and 122. As illustrated in FIG. 2, the external electrodes 141 and 142 may include a first external electrode 141 connected to the first internal electrode 121, and a second external electrode 142 connected to the second internal electrode 122.

The first and second external electrodes 141 and 142 may be electrically connected to the first and second internal electrodes 121 and 122, respectively, to form capacitance. The second external electrode 142 may be connected to an electric potential different from an electric potential of the first external electrode 141.

The external electrodes 141 and 142 may include electrode layers 141a and 142a connected to the internal electrodes 121 and 122, and conductive resin layers 141b and 142b disposed on the electrode layers 141a and 142a.

Further, the external electrodes 141 and 142 may include Ni-plated layers 141c and 142c disposed on the conductive resin layers 141b and 142b, and Sn-plated layers 141d and 142d disposed on the Ni-plated layers 141c and 142c.

When the external electrodes 141 and 142 include the first external electrode 141 and the second external electrode 142, the first external electrode 141 may include the first electrode layer 141a, the first conductive resin layer 141b, the Ni-plated layer 141c, and the first Sn-plated layer 141d, and the second external electrode 142 may include the second electrode layer 142a, the second conductive resin layer 142b, the first Ni-plated layer 142c, and the first Sn-plated layer 142d.

The electrode layers 141a and 142a may include glass and a conductive metal.

The conductive metal used for the electrode layers 141a and 142a is not limited to any particular material as long as it can be electrically connected to the internal electrodes to form capacitance. For example, the conductive metal may be at least one selected from the group consisting of copper (Cu), silver (Ag), nickel (Ni), and alloys thereof.

The electrode layers 141a and 142a may be formed by adding glass frit to the conductive metal powder to prepare a conductive paste, and applying and sintering the conductive paste.

The conductive resin layers 141b and 142b may be formed on the electrode layers 141a and 142a, and may be formed in a shape that completely covers the electrode layers 141a and 142a.

The conductive resin layers 141b and 142b may include a conductive metal and a base resin.

The base resin contained in the conductive resin layers 141b and 142b is not limited to any particular material as long as it has bonding properties and shock absorption abilities, and forms paste when mixed with a conductive metal powder. For example, the base resin may include an epoxy-based resin.

The conductive metal included in the conductive resin layers 141b and 142b is not limited to any particular material as long as it can be electrically connected to the electrode layers 141a and 142a. For example, the conductive metal may include at least one selected from the group consisting of copper (Cu), silver (Ag), nickel (Ni), and alloys thereof.

The Ni-plated layers 141c and 142c may be formed on the conductive resin layers 141b and 142b, and may be formed in a shape that completely covers the conductive resin layers 141b and 142b.

The Sn-plated layers 141d and 142d may be formed on the Ni-plated layers 141c and 142c, respectively, and may be formed in a shape that completely covers the Ni-plated layers 141c and 142c, respectively.

The Sn-plated layers 141d and 142d may serve to improve mounting characteristics.

The first external electrode 141 may include a connection portion C disposed on the third surface 3 of the body 110 and a band portion B extending from the connection portion C to portions of the first and second surfaces 1 and 2. Similarly, the second external electrode 142 may include a connection portion disposed on the fourth surface 4 of the body 110 and a band portion extending from the connection portion to portions of the first and second surfaces 1 and 2.

In particular, the band portion B may extend not only to the portions of the first and second surfaces 1 and 2, but also to portions of the fifth and sixth surfaces 5 and 6 from the connection portion C.

Referring to FIG. 6, of the first external electrode 141, a distance la from the third surface 3 of the body 110 to an end of the band portion B of the first electrode layer 141a may be smaller than a distance lb from the third surface 3 of the body 110 to an end of the band portion B of the first conductive resin layer 141b.

Similarly, of the second external electrode 142, a distance from the fourth surface 4 of the body 110 to an end of the band portion B of the second electrode layer 142a may be smaller than a distance from the fourth surface 4 of the body 110 to an end of the band portion B of the second conductive resin layer 142b.

Accordingly, the conductive resin layers 141b and 142b may be formed in a shape that completely covers the electrode layers 141a and 142a, and may improve bending strength characteristics and bonding strength between the external electrodes and the body.

Referring to FIG. 5, a capacitor component according to another exemplary embodiment may satisfy the relationship $td>2*te$, where td is an average thickness of the first and second dielectric layers 111a and 111b, and te is an average thickness of the first and second internal electrodes 121 and 122.

In detail, according to the exemplary embodiment, the average thickness td of the first and second dielectric layers 111a and 111b may be more than twice the average thickness te of the first and second internal electrodes 121 and 122.

In general, high-voltage vehicle electronic components tend to suffer reliability issues caused by a decrease in dielectric breakdown voltage in a high-voltage environment.

A capacitor component according to another exemplary embodiment may have improved dielectric breakdown voltage characteristics by setting an average thickness td of the first and second dielectric layers 111a and 111b to be more than twice an average thickness te of the first and second internal electrodes 121 and 122 to prevent a decrease in dielectric breakdown voltage in a high-voltage environment, thereby increasing the thickness of the dielectric layer, which corresponds to a distance between the internal electrodes.

When an average thickness td of the dielectric layers 111a and 111b is twice or less than an average thickness te of the first and second internal electrodes 121 and 122, the thickness of the dielectric layer, which corresponds to a distance between the internal electrodes, may be too small, thus causing an undesirable decrease in dielectric breakdown voltage For example, an average thickness te of the first and second internal electrodes may be less than 1.2 µm, and an average thickness td of the first and second dielectric layers 111a and 111b may be less than 4 µm, without being limited thereto.

In particular, an average thickness td of the first and second dielectric layers 111a and 111b may be within the range from more than 2 µm to less than 4 µm. When an average thickness td of the first and second dielectric layers 111a and 111b exceeds 2 μm, air permeability of dielectric material may be insufficient that air traps may be more likely to arise during lamination and compression processes. Thus, it may be more effective to prevent the formation of such air traps by controlling an average thickness t1 of the dielectric patterns 131 and 132, as described above.

As set forth above, according to the exemplary embodiments in the present disclosure, dielectric patterns may be additionally disposed in margin portions to improve the reliability of a capacitor component. However, it will be appreciated by persons skilled in the art that that the effects that could be achieved with the present invention are not limited to what has been particularly described hereinabove and other advantages of the present invention may be clearly understood from the foregoing detailed description.

While the exemplary embodiments have been shown and described above in detail, the present invention is not limited by the above-described exemplary embodiments and accompanying drawings, but by the appended claims. Accordingly, it will be apparent to those skilled in the art that modifications and variations could be made without departing from the scope of the present invention as defined by the appended claims.

What is claimed is:

1. A capacitor component comprising:
a body including first and second dielectric layers, and having first and second surfaces opposing each other in a thickness direction, third and fourth surfaces connected to the first and second surfaces and opposing each other in a length direction, and fifth and sixth surfaces connected to the first to fourth surfaces and opposing each other in a width direction;
a first internal electrode disposed on the first dielectric layer, exposed to the third surface, and spaced apart in the length and width directions from the fourth, fifth, and sixth surfaces by a first space;
a second internal electrode disposed on the second dielectric layer and opposing the first internal electrode with the first or second dielectric layer interposed therebetween, exposed to the fourth surface, and spaced apart in the length and width directions from the third, fifth and sixth surfaces by a second space;
a first dielectric pattern disposed in at least a portion of the first space, extending from the first space, and covering an end portion of the first internal electrode in the thickness direction;
a second dielectric pattern disposed in at least a portion of the second space, extending from the second space, and covering an end portion of the second internal electrode in the thickness direction; and
first and second external electrodes disposed on the third and fourth surfaces of the body, respectively, and electrically connected to the first and second internal electrodes, respectively,
wherein a ratio of t1/te is within the range of 0.6 to 0.9, where "t1" is an average thickness of the first and second dielectric patterns, and "te" is an average thickness of the first and second internal electrodes.

2. The capacitor component of claim 1,
wherein a distance between the first and second internal electrodes adjacent to each other at the end portion of the first or second internal electrode is greater than a distance between the first and second internal electrodes adjacent to each other in a center portion of the first or second internal electrode.

3. The capacitor component of claim 1,
wherein an average dielectric grain size of the first and second dielectric patterns is smaller than an average dielectric grain size of the first and second dielectric layers.

4. The capacitor component of claim 1,
wherein the first and second dielectric patterns have a color different from a color of the first and second dielectric layers.

5. The capacitor component of claim 4,
wherein the first and second dielectric patterns contain a metal complex.

6. The capacitor component of claim 1,
wherein an average thickness of the first and second internal electrodes is less than 1.2 μm, and an average thickness of the first and second dielectric layers is less than 4 μm.

7. The capacitor component of claim 1,
wherein an average thickness of the first and second dielectric layers is within the range of 2 μm to 4 μm.

8. The capacitor component of claim 1,
wherein the relationship of td>2* te is satisfied, where "td" is an average thickness of the first and second dielectric layers.

9. The capacitor component of claim 1,
wherein the first external electrode includes a first electrode layer and a first conductive resin layer disposed on the first electrode layer, and the second external electrode includes a second electrode layer and a second conductive resin layer disposed on the second electrode layer.

10. The capacitor component of claim 9,
wherein the first and second electrode layers contain glass and at least one conductive metal selected from a group consisting of copper (Cu), silver (Ag), nickel (Ni), and alloys thereof.

11. The capacitor component of claim 9,
wherein the first and second conductive resin layers contain a base resin and at least one conductive metal selected from a group consisting of copper (Cu), silver (Ag), nickel (Ni), and alloys thereof.

12. The capacitor component of claim 9,
wherein each of the first and second external electrodes includes a band portion extending onto portions of the first and second surfaces in the length direction,
wherein a distance from the third surface to an end of a band portion of the first electrode layer is smaller than a distance from the third surface to an end of a band portion of the first conductive resin layer, and
a distance from the fourth surface to an end of a band portion of the second electrode layer is smaller than a distance from the fourth surface to an end of a band portion of the second conductive resin layer.

13. The capacitor component of claim 9,
wherein each of the first and second external electrode further includes a Ni-plated layer disposed on the first or second conductive resin layer, and a Sn-plated layer disposed on the Ni-plated layer.

14. A capacitor component comprising: a body having first and second surfaces opposing each other in a thickness direction, third and fourth surfaces connected to the first and second surfaces and opposing each other in a length direction, and fifth and sixth surfaces connected to the first to fourth surfaces and opposing each other in a width direction, the body including at least one first internal electrode and at least one second internal electrode with at least one dielectric layer interposed therebetween in the thickness direction; first and second external electrodes disposed on the third and fourth surfaces of the body, respectively, and electrically connected to the at least one first internal electrode and the at least one second internal electrode, respectively, wherein the at least one first internal electrode and the at least one second internal electrode are exposed to the third and fourth surfaces, respectively, of the body to be electrically connected to the first and second external electrodes, respectively, wherein the body further includes a first dielectric pattern disposed on a same plane as the at least one first internal electrode and disposed between an end portion of the at least one first internal electrode and an adjacent outer surface of the body to which the at least one first internal electrode is not exposed, the first dielectric pattern having a step portion overlapping the end portion of the at least one first internal electrode in the thickness direction, and wherein the body further includes a second dielectric pattern disposed on a same plane as the at least one second internal electrode and disposed between an end portion of the at least one second internal electrode and an adjacent outer surface of the body to which the at least one second internal electrode is not exposed, the second dielectric pattern having a step portion overlapping the end portion of the at least one second internal electrode in the thickness direction, wherein a ratio of t1/te is within the range of 0.6 to 0.9, where "t1" is an average thickness of the first and second dielectric patterns, and "te" is an average thickness of the at least one first internal electrode and the at least one second internal electrode.

15. The capacitor component of claim 14, wherein a distance between the at least one first internal electrode and the at least one second internal electrode adjacent to each other at the end portion of the at least one first internal electrode or the at least one second internal electrode is greater than a distance between the at least one first internal electrode and the at least one second internal electrode adjacent to each other in a center portion of the at least one first internal electrode or the at least one second internal electrode.

* * * * *